United States Patent

[11] 3,536,180

| | | |
|---|---|---|
| [72] | Inventor | Gerard Dubus<br>Combs-la-Ville, France |
| [21] | Appl. No. | 706,155 |
| [22] | Filed | Feb. 16, 1968 |
| [45] | Patented | Oct. 27, 1970 |
| [73] | Assignee | Service D'Exploitation Industrielle des Tabacs et des Allumettes<br>Paris, France<br>A French public establishment |
| [32] | Priority | Feb. 17, 1967, July 28, 1967 |
| [33] | | France |
| [31] | | 95,431 and 116,128 |

[54] DEVICE FOR COLLECTING AND DISTRIBUTING OBJECTS FROM A PLURALITY OF PARTIAL STREAMS
9 Claims, 4 Drawing Figs.

[52] U.S. Cl. .................................................. 198/30,
198/32, 198/34, 198/38, 198/40, 198/79
[51] Int. Cl. ....................................................... B65g 43/08,
B65g 37/00, B65g 47/26
[50] Field of Search ............................................ 198/32, 78,
79, 40, 38

[56] References Cited
UNITED STATES PATENTS
1,281,579  10/1918  Johnson ...................... 198/79
3,014,573  12/1961  Baumann et al. ............. 198/38

Primary Examiner—Evon C. Blunk
Assistant Examiner—Roger S. Gaither
Attorney—Sparrow and Sparrow ABSTRACT: A device for collecting and distributing objects derived from a plurality of streams and discharged on one endless conveyor, comprising means for dividing said conveyor into successive longitudinal portions, a gate opening successively the discharge end on said conveyor of each stream of a determined series of said streams as soon as an object discharged by an upstream stream of said series is passed in front of said discharge end and a free sufficient space is provided behind said object, whereby forming on each of said portions a line of objects as near as possible to one another.

Patented Oct. 27, 1970

INVENTOR
GÉRARD DUBUS
BY SPARROW and SPARROW
ATTORNEYS

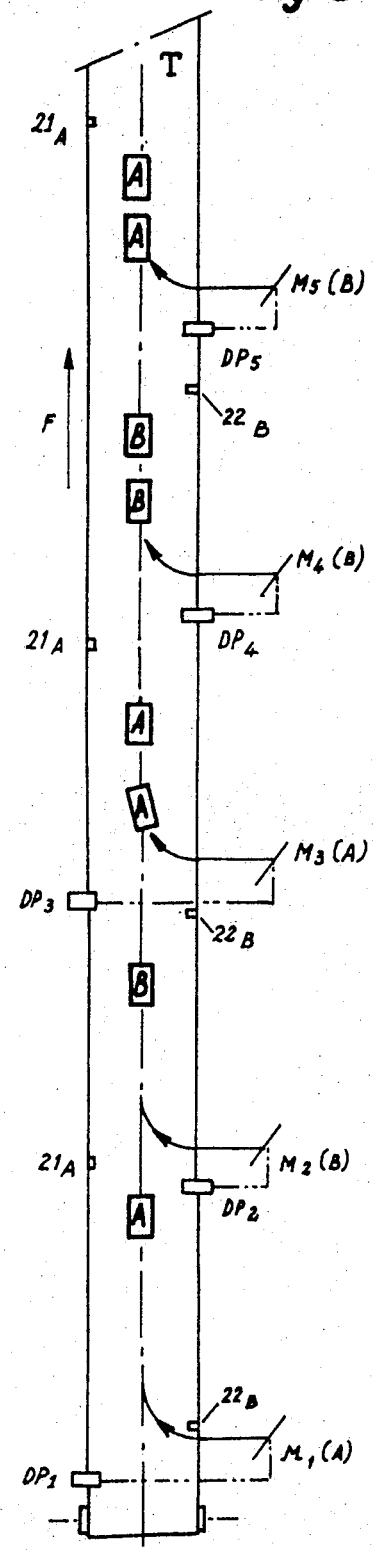
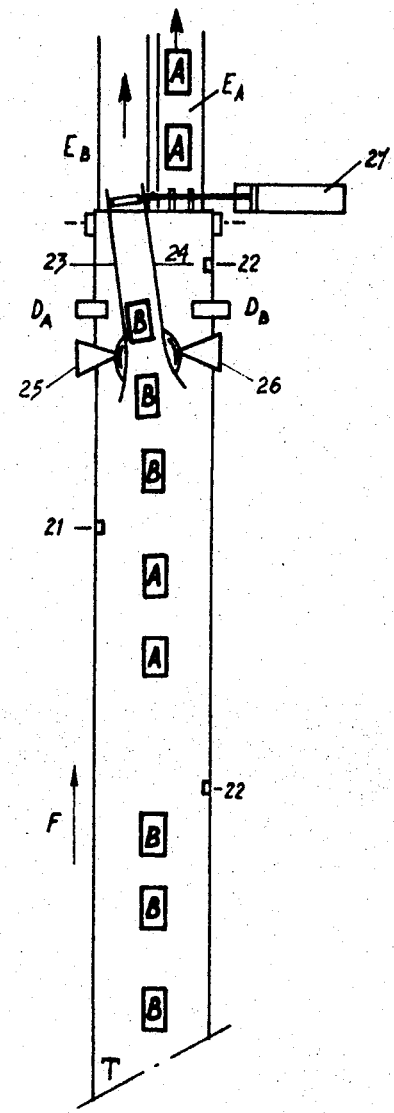

DEVICE FOR COLLECTING AND DISTRIBUTING OBJECTS FROM A PLURALITY OF PARTIAL STREAMS

This invention relates to the continuous and mechanized handling of unitized loads of medium weight and volume such as those which are mass-produced in many conversion industries, by means of endless-belt conveyors.

In particular, the invention provides a solution to the problems which arise when output streams from a plurality of machines delivering identical or similar objects at high production speeds which are usually of proximate value but not necessarily very constant are united in a single stream on common conveyors.

The invention is specially suited to the case in which a common conveyor is a high-speed moving conveyor of the type consisting of an endless belt or band coated with elastic material such as rubber or elastomer.

In addition, when the objects produced by a number of machines have to be aligned on a common conveyor in a row which has its axis in the conveying direction, the invention can very readily satisfy this requirement and makes it possible to maintain said objects in a preferential orientation.

However, without thereby departing from its field of application, the invention can be adapted to a very wide range of operating conditions, layouts and combinations in regard to the number of input streams, the number of objects admitted from each stream at each operating cycle, the number of rows or lines of objects formed on a common conveyor, the junction of said lines or streams of a plurality of common conveyors.

The invention is characterized by the features which will be described hereinafter and which may be considered either separately or in combination, viz:

The incident streams are controlled so that a predetermined number of objects is released in turn onto a common conveyor.

Each "turn of operation" or successive release of an incident stream is initiated in the order of positional arrangement of the stream inlets on the common conveyor, so that the group of objects derived from a stream of the order $n$ joins the common path immediately behind the group of objects derived from the stream of the order ($n-1$).

The turn of operation referred to is determined by the presence of at least one detectable marker which moves along with the common conveyor.

The mechanism of control of a stream is dependent both on a first detector which responds to the transition of a detectable marker which progresses with the common conveyor and on at least one second detector which is responsive to the positioning of objects derived from streams which are discharged upstream.

The first detector indicates to the control mechanism that its turn of operation is about to take place and the second detector indicates the optimum moment.

Each detectable marker can be a metallic component which is fixed on the nonmetallic band of the common conveyor and which passes opposite to at least one detector, said detector being assigned to a control mechanism comprising a proximity detector.

The second detectors which are responsive to the positioning of objects derived from streams discharged upstream can be photoelectric projector-detector assemblies.

A good example of a plant in which a device of the above type can be employed to advantage is that of a workshop for packing commodities of any type, in which a packing machine is supplied with the product to be wrapped or packed from a number of production machines disposed in parallel. The problem is different if it is required to supply uniform products to a number of packing machines which are fed by forming machines whose production differs in either one or a number of characteristics such as composition, color, presentation and so forth.

However, in the case last mentioned also, it would be an advantage to be able to process simultaneously in a same "bank" of packing machines different commodities which would subsequently be divided into a number of streams corresponding to the number of different qualities of commodities while nevertheless retaining the possibility of changing the production of one or a number of machines in a very short time. By means of this general layout, the capacity of all installed machines could be utilized to the maximum without entailing any slowing down of production as a result of any changes in distribution of the required supply between the different commodities processed.

The present invention has therefore for a further object a method of collecting and distributing products which are derived from a number of sources and which may have different characteristics, wherein the products are transferred beyond their sources and prior to distribution to a common conveyor and wherein successive longitudinal sections of said common conveyor are assigned to the different categories of product, said categories being distributed towards their respective destinations as a function of the section of the conveyor which passes opposite to a distributor unit.

The invention further consists in a device for collecting and distributing different categories of products derived from a number of sources at least equal to the number of categories, the collection of all the products being carried out on the same conveyor, and comprising the following arrangements considered in a number of different combinations:

Identifiable markers divide the common conveyor into successive longitudinal sections, each section being assigned to a category of products which is different from those of the upstream and downstream sections;

The headmarker of any one section synchronizes the successive discharge from all the sources which deliver products of the category to which said section is assigned; and The headmarker of a section initiates the change of state of a means for selecting different categories on the common conveyor.

It has been proposed above to form on the common conveyor trains of products each constituted as a maximum by all the groups of a selected number of articles derived from each incident stream, these groups being in any case located downstream to upstream in the order of arrival in the upstream to downstream direction of the incident streams on the common conveyor. It can be stated that a detectable marker which has indicated to all the mechanisms for releasing streams that their turn of operation was about to take place is the pilot or control element of the train which said marker has formed. It should incidentally be pointed out that it is not essential to ensure that said marker is materially located at the head of the train which it controls. If the detectors of said marker are all displaced rearwardly by a given length (that is to say towards the upstream end of the conveyor belt) with respect to the gates which they control, the marker will be located behind the head of the train by a distance equal to said length which is reduced by the timelag or time taken by the first group of articles to reach the collecting belt from the time of the signal given by the marker.

It has been found that said control marker can serve in many different ways to identify the train of objects which follows (or at least which it accompanies). Beyond that portion of the conveyor onto which the incident streams are discharged, the passage of a marker in front of an index indicates the arrival—either impending or simultaneous—of a certain number of products. If said marker can only initiate the operation of gating mechanisms for stopping the supply from certain sources whose products have a predetermined identity, it can be ensured that, between the transfer of said marker and the transfer of a following marker which produces action on other sources, only those products which have the requisite identity will accordingly pass along the conveyor.

By means of the process which consists in dividing an endless conveyor belt into longitudinal sections assigned to the products derived from certain streams selected from a series of incident streams, it is therefore possible not only to synchronize the collection of said streams but also to effect a distribution of batches which have been regrouped.

Reference will now be made to the accompanying drawings, in which:

FIG. 3 is a plan schematic view of the receiving portion of a common conveyor having a number of supplies from machines delivering objects of two different types; and FIG. 4 is a plan view of the discharge portion of the conveyor of FIG. 3.

Figure 1:
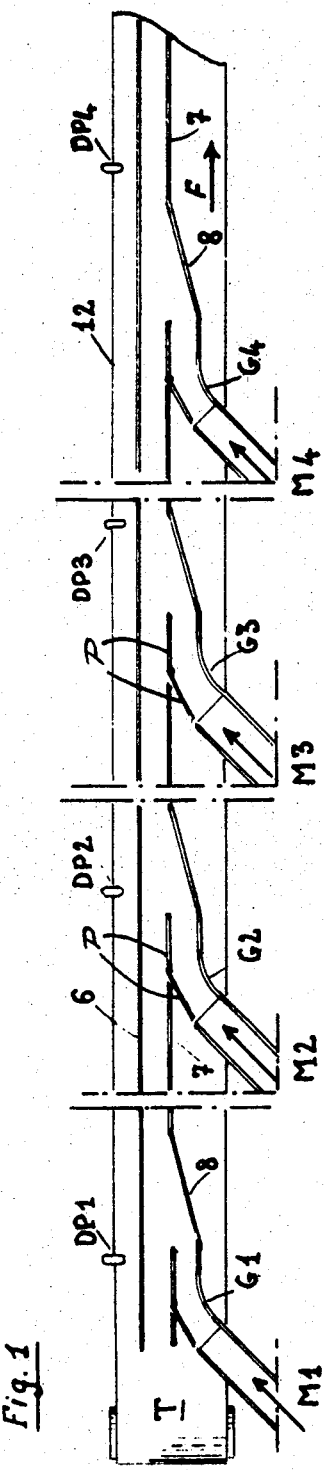
FIG. 1 is a plan view of an endless belt conveyor on which it is desired to combine into a single line the production of a number of machines which deliver similar objects.
Figure 2:
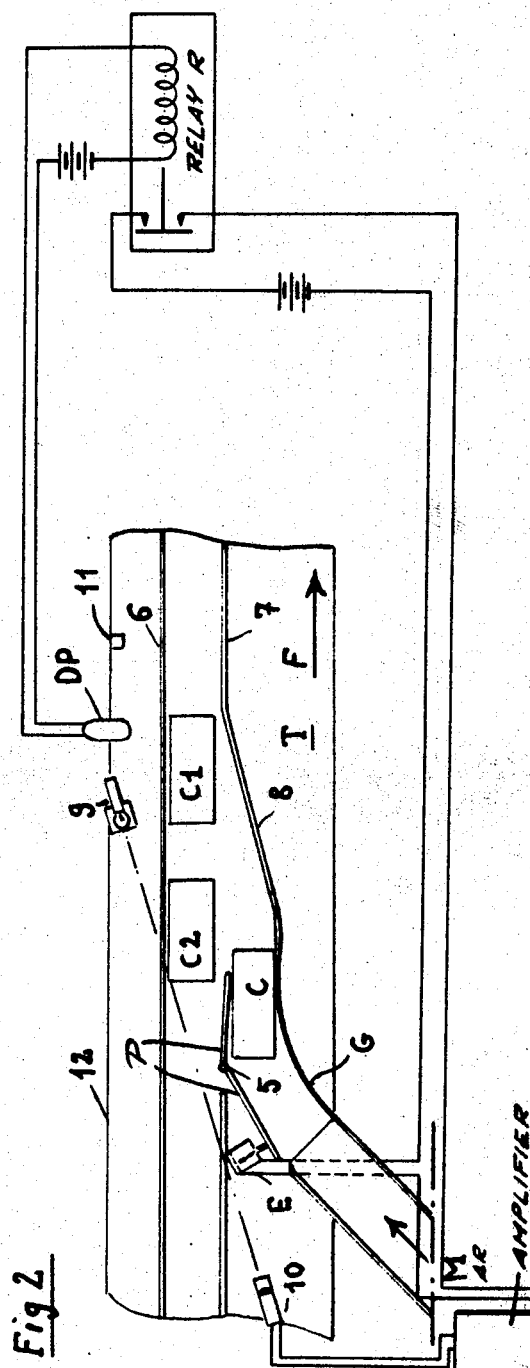
FIG. 2 is a detail view on a larger scale showing a portion of the conveyor of FIG. 1 at the location of one of the gates through which objects are admitted onto the conveyor.

In the embodiment shown in FIGS. 1 and 2, provision is made for four machines, although a larger number may be contemplated. By way of example, these machines can be of the type employed for commercial packing of cigarettes in standard cartons. By reason of the fact that these cartons are relatively deformable and fragile, a limitation has to be imposed both on the permissible velocity of the conveyor belt T and on the length of time during which the production of a given machine can be prevented from being discharged onto the conveyor. The barrier, which prevents such a discharge, consists of a gate, as shown in FIG. 2. Cartons are delivered from each machine onto the belt T by means of a curved chute G in which the cartons C move down, for example, simply under the action of gravity. Said gate is composed of two pallets in the form of a very wide V which are capable of pivoting about the pin 5 under the action of a double-acting operating unit E (such as a jack or an electromagnet) which is actuated by the control system of the machine as will be explained below. Said pallets are adapted to move from the position shown in FIG. 2 in which the downstream pallet holds a carton C within the preadmission lock chamber to a second position in which the carton is subsequently released onto the belt T, but in which the upstream pallet will arrest for a short period any carton which may immediately follow. The aim of this device is to release as required and in unitary sequence the cartons produced by the machine which is thus controlled. Under the action of a short time control, said gate returns automatically to the position shown as soon as the discharge of the carton C has in fact taken place.

The conveyor belt T may be horizontal, for example, and is provided with stationary guides 6 and 7 which are intended to align the cartons during transportation. Said guides could consist of burnished thin-wall tubes which are fixed on the conveyor frame by means of supports (not shown in the drawings). Each preadmission lock chamber is joined to a guide 7 by means of a ramp 8 of similar construction. The conveyor belt T is adapted to move in the direction of the arrow F shown in FIG. 1 at an optimum speed which is determined by experience, subject to the considerations mentioned hereinafter. It is understood that a carton such as the carton C which is released by a gate will almost instantaneously acquire the velocity of the belt on which it is already carried. However, by reason of the inertia of the releasing mechanism, the response time of which can vary to an extent which should be reduced as far as possible but the maximum value of which must nevertheless be determined as a precautionary measure and also by reason of the different friction forces, there always remains a margin of uncertainty as to the exact position of a carton at the instant which follows its release after a given time interval. If the maximum delay allowed for a carton to pass out of the preadmission chamber with respect to the theoretical delay required from the instant of delivery of the release signal is computed in hundredths of a second and is designated as $dt$; and if, in addition, the velocity of the collector belt T in meters per second is designated as V, then the value in respect of the maximum lag, or extent to which said carton is liable to be retarded, will be equal in centimeters to $V \times dt$.

It is this value which must be taken into consideration and added to the length of a carton C in order to find the space L which is necessary in order to insert a standby carton between two cartons which have already been engaged between 6 and 7. It is possible by means of a projector 9 and a photoelectric detector 10 which are placed slantwise with respect to the path of the objects to ensure that said space is available behind a carton shown at $C_2$ in FIG. 2 before giving the signal for the release of C. In this case, however, it is necessary each time to provide for a systematic loss of space, with the result that the velocity V of the conveyor belt must be determined accordingly. It is apparent that, by increasing this velocity, which is already subject to disadvantages by reason of the stresses exerted on the cartons, the carrying capacity of the installation is not thereby increased in the same proportion since, in the case of constant values of $dt$, the apparent length or overall space requirement L of a carton increases to a corresponding extent.

According to the principle of the invention, the opening of a gate is made dependent not only on the correct position of the carton $C_1$ which will precede the carton C within the passageway between 6 and 7, but on a turn of operation which is established as a function solely of the position location of the machines M. Thus, it is possible to release a carton at the gate of the machine $M_1$, then of $M_2$, then of $M_3$ and so forth in the order of location of the machines, as soon as a detection system assigned to each machine starting from $M_2$ has determined the appropriate position of the carton derived from the preceding machine.

The detection systems referred to will advantageously be of the type described above and consist of a photoelectric projector and detector 9 and 10. It is merely necessary to ensure that the length L as determined hereinabove is available behind a carton such as $C_2$ so that, in a favorable case, said length should correspond in the majority of instances to the transfer of a number of cartons equal to the number of machines located upstream of the machine considered. There are thus formed "trains" of cartons in which the products are located from the downstream end to the upstream end in the order of location of the machines considered from the upstream end to the downstream end.

It should be pointed out that, as soon as $n$ becomes a sufficiently great whole number, the length of a train of $n$ cartons will always be smaller than $n \times L$. In fact, a detection system such as 9—10 comes into action as soon as the last of the cartons delivered by the "upstream" machines has passed and maximum benefit is thus derived from the closing up of consecutive cartons which takes place each time the value of the delay which has developed within a preadmission chamber is smaller than the maxium value $dt$ as determined above. It will be possible to calculate that the length of the train which passes opposite to a gate of the order $n$ which is located farthest downstream is appreciably smaller than the theoretical length $(n - 1)$ L and, taking into account the maximum production frequency of the machines, to determine a velocity V which is as low as possible.

In order to coordinate the sequences of operation of the gates, it has been found that use could be made of the actual motion of the conveyor belt which corresponds exactly to the process of optimum operation. To this end, the belt T is made to carry a marker 11 corresponding to the predetermined position of the head carton of a train, said carton being produced by the machine $M_1$. The passage of this marker opposite to each machine will be detected by a detector which is assigned to the corresponding gate. One simple expedient consists in placing on a belt formed of organic material a metallic clip such as a staple on the free edge 12 and in monitoring the passage of said marker by means of proximity detectors DP.

The operation of a device of this type is as follows: the staple 11 passes beneath the proximity detector $DP_1$, the gate of the machine $M_1$ releases a carton $C_1$ which acquires the velocity of the belt T and progresses between the guides 6 and 7 at an interval relative to the marker which remains within precise limits. When the staple 11 subsequently passes beneath the proximity detector DP2 which corresponds to the machine $M_2$, the signal delivered will set a special relay R which will remain energized. A photoelectric unit 9—10 is placed in such a manner as to ensure that, by sweeping the track located between 6 and 7, the beam will then be intercepted by the carton $C_1$ but that, as soon as the rear end of said carton has finally passed beyond the position in which a carton $C_2$ released at the same instant by the machine $M_2$ can no longer come into contact with $C_1$, the beam emitted by the projector 9 impinges upon the photoelectric cell 10. The amplifier relay AR of the photoelectric cell will emit a signal which, via the relay which has been set by the proximity detector DP2, will energize the operating member E of the gate of $M_2$. A carton $C_2$ will be released while the relay R will be returned at the same time to the rest position.

The operation will be the same from point to point, except that the photoelectric units 9 and 10 which are assigned to the following machines will be placed in such a manner as to check the absence of cartons over the distance L which is necessary for a satisfactory insertion after the passage of a staple 11 beneath the corresponding proximity detector.

This embodiment provides a remarkably wide range of adjustments since it is possible to vary with great ease the velocity of the conveyor-belt T, the distance between a number of staples 11, the positions of the proximity detectors DP and the position of the photoelectric projectors 9 and detectors 10, thereby making it possible to adapt the installation to an increase in output of the machines and to gain an additional advantage by means of any improvement which can be made in the precision of operation of the admission gates.

In the embodiment of FIGS. 3 and 4, the common conveyor shown at T is a flexible endless belt, the upper carrying run of which is assumed to be horizontal. The direction of progression of said carrying run is that of the arrows F. Said conveyor belt is employed for the purpose of collecting and transporting packages formed by five machines designated by the references $M_1$, $M_2$, $M_3$, $M_4$ and $M_5$ and coupled with the belt T by means of channels which are represented schematically by the curved arrows, said channels being controlled by a system of gates. It is assumed that the machines $M_1$ and $M_3$ form packages of a product of one variety and that the machines $M_2$, $M_4$ and $M_5$ form packages of products of another variety. The first packages are indicated by the letter A and the second packages are indicated by the letter B.

Metallic staples 21 and 22 are attached by clamping, for example, on the edges of the conveyor belt T at uniform intervals so that, taking into account the speed of the conveyor belt and the rate of delivery of the machines, the distance between a staple 21 and the staple 22 which immediately follows (looking at the moving conveyor from a fixed point) is sufficient to allow two packages A to be readily introduced, and that three packages B can be inserted between said staple 22 and the following staple 21. The staples 21 are attached in this case on the left-hand edge of the belt T and the staples 22 are attached on the right-hand edge. It is apparent that, despite its obvious advantages, this arrangement is not essential and that a plurality of metallic markers can be fastened on a same side of a belt, small differences in distance relative to the centerline of the conveyor being sufficient to permit of their discrimination by suitably selected and suitably located detectors.

The detectors which are responsive to the passage of the staples 21 and 22 have been designated by the letters DP followed by the same index as the machine to which they are assigned. Thus, the detector DP1 controls the machine $M_1$ (or its gate system if necessary). Depending on circumstances, these detectors can be responsive to the elevation of a staple above the belt surface, to its electrical conductivity, to its magnetism, to its reflecting power or to any other property which serves to distinguish it clearly from its support, in this case the conveyor belt T. However, preference is nevertheless given to electronic proximity detectors by reason of the fact that, in respect of a high velocity of the conveyor and of staples having a small thickness, such detectors can provide a particularly clear signal which can readily be processed.

At the downstream end of the belt T, there have been placed in oppositely facing relation two detectors DA and DB which are intended to control the system of selection of packages. Said system can consist of two symmetrical ramps 23 and 24 which are pivotally mounted at the head end thereof on bearing brackets 25 and 26 and actuated at the opposite end by a double-acting compressed-air jack as shown at 27. Electric relays (not shown in the drawing) controlled by detectors DA and DB are intended to control electrovalves on jack 27 for the rapid operation thereof and consequently the virtually instantaneous change of orientation of ramps 23 and 24.

In order to follow up the common conveyor, it has been assumed that the packages which are carried forward by their own momentum reach the inclined planes EA or EB. However, it is apparent that the mechanism of selection and mode of discharge of products can vary to a very wide extent depending on the nature of commodities handled and the effect which it is desired to obtain.

The operation of the assembly is as follows:

The passage of a staple 21 A beneath the proximity detector DP 1, which controls the machine $M_1$ will initiate the release of a package A which will reach the conveyor belt T at a short distance to the rear of said staple 21A. It will readily be understood that it is easy to adjust this distance by setting the detector DP 1 at a greater or lesser distance forward of the outlet channel of $M_1$. The timing introduced by the distance between detector and outlet channel can in any case be utilized for the purpose of arranging the packages of each category in order behind each other; this simplified mode of procedure is wholly suitable when there exists a small number of sources for each category of products and when the number of packages on the collector belt is not close to the saturation value. On the contrary, when it is an advantage to reduce the spacing between packages to a maximum extent in the case of a large number of sources, use will be made of checking means for the purpose of delaying discharge of the channels beyond the first as long as a sufficient length of conveyor belt is not found to be available.

A staple 22 B which passes beneath the detector DP 2 will initiate in the same manner the release of a packages B through the outlet channel of $M_2$. When a staple 21 A has passed opposite to DP 3, a second package A will pass onto the conveyor behind the package derived from the machine $M_1$. Similarly, the package B which are derived from the machines $M_4$ and $M_5$ will come into position in turn behind the package B which follows the staple 22B. At the output end of the zone of discharge from the machines, there will therefore be present on the conveyor trains of packages A following a marker 21 and trains of packages B following a marker 22, as shown at the bottom of FIG. 2.

The passage of a staple 21 beneath the detector DA will produce the immediate energization of the electric relay, thereby initiating the opening of the electrovalve and resulting in the operation of the jack 27. As the jack retracts, so the ramps 23 and 24 will be moved in the direction of the inclined plane EA onto which the two packages A will be discharged. The passage of the staple 22 beneath the detector DB will similarly initiate the movement of extension of the jack 27 and the orientation of the packages B which follow said staple towards the inclined plane EB.

Many complementary features can be incorporated in this device, especially in regard to the alternate arrangement of markers as a function of the rate of production from the different sources, in regard to the number of qualities of products, to the manner in which the lines of identical products are made up, and to the modes of selection of the different products after the trains have been made up.

I claim:

1. A device for collecting and distributing objects derived from a plurality of streams and discharged on conveying means, said device comprising in combination a main conveyor, a plurality of tributary conveyors having a discharge end and to discharge said objects on said main conveyor through said discharge end, a gate at said discharge end of each one of said tributary conveyors, said gate stopping said objects at said end, means for controlling each one of said gates, at least one mark attached on said main conveyor, a first detector corresponding to each one of said gates for detecting the passage of said mark, means corresponding to each one of said gates and responsive to the absence of said objects in a determined zone of said main conveyor in the proximity of one of said gates, and control means for each one of said gates connected to both said first detector and said responsive means, said control means adapted to be actuated when said first detector and said responsive means have successfully detected the passage of a mark and the absence of said objects in said determined zone.

2. A device for collecting and distributing objects according to claim 1, wherein said gates consist of double pallets in the shape of a wide V.

3. A device for collecting and distributing objects according to claim 1, wherein a plurality of marks are attached to said conveyor.

4. A device for collecting and distributing objects according to claim 3, said conveyor consisting of a nonmetallic material, said marks consisting of metallic members attached to said conveyor, and said first detectors being proximity detectors.

5. A device for collecting and distributing objects according to claim 1, wherein said means responsive to the absence of said objects consist of photoelectric means.

6. A device for collecting and distributing objects according to claim 1, said conveyor having longitudinally divided portions, one portion being a conveying portion and the other portion being a waiting portion, said tributary conveyors discharging said objects to said waiting portions, and said gates having means providing communications between said conveying portions and said waiting portions.

7. A device for collecting and distributing objects according to claim 1, wherein said marks are aligned along parallel paths.

8. A device as in claim 7 wherein said marks are alternately located on one side and on the other of the conveyor.

9. A device for collecting and distributing objects according to claim 1, further comprising at the end of said main conveyor a plurality of receiving means, means directing said objects towards one or the other of said receiving means, controlling means for said directing means, second detector means responsive to the passage of said marks, said second detector means selectively actuating said controlling means responding to said passage of said marks.